United States Patent Office 3,391,992
Patented July 9, 1968

3,391,992
FEED GRADE DICALCIUM PHOSPHATE
James W. Watson, Lansing, Ill., assignor to Swift & Company, Chicago, Ill., a corporation of Illinois
No Drawing. Filed June 4, 1964, Ser. No. 372,686
5 Claims. (Cl. 23—109)

ABSTRACT OF THE DISCLOSURE

A method comprising diluting superphosphoric acid with sufficient water to reduce the phosphorus pentoxide content of the solution and after hydrolysis a nontoxic calcium salt is reacted with the solution in such a manner that dicalcium phosphate having an elemental phosphorus to elemental fluorine ratio of more than 100 to 1 is produced.

---

This invention relates to an improved method for the manufacture of edible food-grade phosphate salts and more particularly to an improved method for the production of nontoxic calcium phosphate.

Certain nontoxic phosphate salts, particularly dicalcium phosphate $CaHPO_4 \cdot 2H_2O$ have been used extensively in animal feeds as a dietary supplement, as ingredients of dental powders and as a mineral supplement in cereals and other foods. These salts, if they are to be classified as being of "feed grade," must contain a high percentage of calcium and phosphorus and an extremely low percentage of elemental fluorine. The conventional method of expressing whether a given calcium phosphate is acceptable for use in foods is by the elemental phosphorus to elemental fluorine ratio. This ratio must be at least 100 to 1 in order for the product to be acceptable as a feed-grade calcium phosphate and in most cases, the ratio should be higher than 100 to 1.

The desirability of producing edible phosphate salts from cheap wet-process phosphoric acid has been recognized for many years but no commercially-practical process for producing feed-grade phosphates from such acid has been developed which is comparable or equivalent to the process using electric furnace phosphoric acid. Thus the dicalcium phosphate salts currently used in feeds and as dietary supplements are prepared from electric-furnace phosphoric acid, which is substantially free of elements such as silicon and fluorine normally found in wet-process acid. Another method which has been used involves an involved double precipitation process. This comprises first treating fluorine containing phosphoric acid at a given pH to precipitate a fertilizer grade product and subsequently treating the acid at a different pH to precipitate a feed grade product. Ordinary crude wet-process phosphoric acid either 32% $P_2O_5$ acid or 54% $P_2O_5$ acid, although it can be reacted very smoothly with lime or limestone to produce dicalcium phosphate, cannot be used in the manufacture of feed-grade product because the resulting product contains excessive amounts of fluorine.

Methods for removing fluorine from crude wet-process phosphoric acid have been suggested but these methods are expensive or require the use of specialized equipment or result in the loss of phosphoric acid values from the acid being treated. Both physical defluorination methods involving distillation and chemical defluorination methods involving precipitation of fluorides have been suggested as a means for converting crude wet-process phosphoric acid to a low-fluorine acid. All of these procedures have been less than optimum in improving the competitive relationship of wet-process acid to electric-furnace acid in the production of edible phosphate salts.

It is accordingly an object of this invention to provide a simple and economical method for the manufacture of feed-grade phosphate salts from wet-process phosphoric acid.

An additional object of the invention is to provide a method for producing feed-grade dicalcium phosphate from superphosphoric acid while avoiding excessive build-up of reactants in the manufacturing equipment.

Still another object of the invention is to provide a method for producing dicalcium phosphate having an elemental phosphorus to elemental fluorine ratio in excess of 100 to 1 in conventional mixing equipment.

Additional objects of the invention, if not specifically set forth herein, will be readily apparent to those skilled in the art from the detailed description of the invention which follows.

Generally, the invention is concerned with an improved method for producing feed-grade dicalcium phosphate from wet-process phosphoric acid. The method provides a means for utilizing wet-process acid in a manufacturing operation in which electric-furnace phosphoric acid has been used primarily in the past. Thus, the use of wet-process acid is extended considerably by the method of the invention and it is possible to utilize conventional equipment in the manufacturing process. The process comprises contacting diluted superphosphoric acid with a reactive inorganic calcium salt which is free of toxic residues and agitating the mixture of reactants so as to promote uniform mutual contact of the reactants and avoid an accumulation of unreacted superphosphoric acid or calcium salt. The dicalcium phosphate product is screened and dried, if desired, and stored for packaging or distribution. The dicalcium phosphate product is equivalent in all respects to dicalcium phosphate made from the much more expensive electric-furnace phosphoric acid and possesses an elemental phosphorus to elemental fluorine ratio greater than 100 to 1.

More specifically, the method of the invention comprises contacting superphosphoric acid with water to convert the polyphosphoric content thereof to orthophosphoric acid and reacting the thus diluted superphosphoric acid with approximately a stoichiometric amount of calcium oxide, calcium hydroxide or calcium carbonate or other inorganic calcium salt which does not provide a toxic residue. The reaction can be carried out by simply mixing the reactants and promoting intimate contact between the diluted superphosphoric acid and the reactant calcium salt. The reaction is very exothermic in nature and may require some cooling although, in most cases, if the reaction is carried out with the reactants substantially at room temperature, the temperature rise during reaction will not be so great as to require substantial provision for cooling. In some cases, the reaction will take place at slightly higher temperatures particularly if the diluted superphosphoric acid is warm as a result of the heat generated in diluting the acid with water.

Wet-process phosphoric acid is obtained by the acidulation of phosphate rock with a strong mineral acid such as sulfuric acid. This acid is concentrated to higher $P_2O_5$ content by evaporating the acid either under atmospheric or vacuum conditions. Crude wet-process phosphoric acid containing about 32% $P_2O_5$ is conventionally concentrated by evaporation to 54% $P_2O_5$ acid. Superphosphoric acid is prepared by further concentrating the 54% $P_2O_5$ phosphoric acid by thermal dehydration with a vacuum evaporator or by submerged combustion to provide an acid having about 65–80% $P_2O_5$. The fluorine content of such acid is low (less than about 0.3%) and the elemental phosphorus/elemental fluorine ratio of the acid is greater than 100 to 1. However, the acid is an orthopshosphoric acid in admixture with pyrophosphoric acid and small amounts of more condensed acids such as polyphosphoric acid and metaphosphoric acid. The pyrophosphoric acid is comparatively unreactive and the superphosphoric acid is quite viscous. When superphosphoric acid is reacted with solids such as calcium oxide or calcium carbonate a superficial reaction takes place inasmuch as it is difficult to maintain contact between the syrupy, tacky superphosphoric acid and the dry, powdery calcium salt. The product rapidly assumes the form of a pasty mass which accumulates on the surface of the containing vessel precluding the obtention of a complete reaction.

Hydrolysis of the nonorthophosphoric acids present along with orthophosphoric acid in superphosphoric acid is possible by adding a small amount of water to the superphosphoric acid. Superphosphoric acids containing about 65–80% $P_2O_5$ and usually not more than about 1% water can be used in the method of this invention although in the preferred form of the invention, superphosphoric acid containing about 69–73% $P_2O_5$ is used.

The superphosphoric acid must first be hydrolyzed to convert polyphosphoric acids to orthophosphoric acid, which allows for carrying out the reaction in conventional equipment such as a superphosphate pan mixer. Sufficient water should be added to the superphosphoric acid to adjust the $P_2O_5$ content of the diluted superphosphoric acid to about 40–55% and preferably about 45–50%. The hydrolysis of the superphosphoric acid with water takes place very rapidly, especially when the mixture is heated, and the pyrophosphoric acids are rapidly converted to ortho acids when heated with aqueous orthophosphoric acid. While as much as thirty minutes may be required to hydrolyze superphosphoric acid at 160° F., only about 2–5 minutes are necessary to obtain the same result when the mixture is heated to 212° F. In general, hydrolysis is slower at lower temperatures and the rate of hydrolysis increases with increasing temperature. If for some reason hydrolysis is carried out at around room temperature (71° F.) about 400 hours will be required for complete hydrolysis.

Dilution with water and the resultant hydrolysis of superphosphoric acid is required in accordance with the method of this invention if a smooth conversion of superphosphoric acid to nontoxic phosphate salt without using special equipment is to be realized. If the superphosphoric acid is not first treated with the required amount of water, the acid, when mixed with the solid calcium salt, will form a tacky, pasty mass which becomes plastered on the sides of the equipment. The buildup or accumulation of this mass soon provides sufficient resistance to mixing that the equipment cannot handle the mass and only partial contact of the reactants is realized. Thus, a small amount of reaction product is obtained and a substantial amount of partially reacted acid and calcium salt, as well as unreacted starting materials, is plastered on the surface of the manufacturing equipment.

In carrying out the reaction, the hydrolyzed superphosphoric acid is reacted with calcium oxide or calcium carbonate, preferably finely pulverized, by spraying the hydrolyzed dilute superphosphoric acid over the surface of a bed of the calcium salt while gently agitating the bed. The reaction is very exothermic and is usually carried out in a superphosphate pan mixer or other similar conventional equipment usually found in phosphate processing facilities. The product of the reaction does not usually need to be dried further inasmuch as each of the reactants contains very little moisture and the reaction takes place at an elevated temperature promoting volatilization of any water present in the mixture. In those cases where drying is considered necessary or desirable, the product can be dried on conventional drying equipment.

The examples which follow are presented herein only for the purpose of illustration and should not be considered in any sense limitative.

EXAMPLE I

Wet-process superphosphoric acid having 70.49% $P_2O_5$, 30% phosphorus and 0.192% fluorine was diluted by adding 610 pounds of water to 2,000 pounds of the acid at about 75° F. The acid was stirred during the addition of the water and the temperature rose to 155° F. The temperature of the diluted acid was maintained at 220° F. for about 15 minutes to insure complete hydrolysis of the polyphosphoric acids in the superphosphoric acid. 1,520 pounds of the acid which now contained 54% $P_2O_5$ was added to an agitated bed of 698 pounds calcium oxide (92.9% CaO, .06% F) in a superphosphate pan mixer and the contents of the mixer were agitated for 2–3 minutes to provide a dicalcium phosphate product containing 18% phosphorus and an elemental phosphorus/elemental fluorine ratio of 117 to 1. Product analysis is as follows.

| Ingredient: | Amount in percent |
|---|---|
| Phosphorus | 18.1 |
| Dicalcium phosphate ($CaHPO_4$) equivalent | 61.6 |
| CaO | 33.9 |
| Free acid as $H_3PO_4$ | 0.0 |
| Fluorine | 0.155 |
| Moisture | 0.88 |

EXAMPLE II 1,520 pounds of the hydrolyzed superphosphoric acid prepared in accordance with the method of Example I was mixed with 1,200 pounds of calcium carbonate (97% $CaCO_3$) in a conventional superphosphate pan mixer. The mixing was carried out for about 2–3 minutes to obtain substantial distribution of the acid throughout the pulverized limestone. The product analysis before and after drying is as follows:

| Ingredient | Percent of Ingredient | |
|---|---|---|
| | Before Drying | After Drying |
| Phosphorus | 16.7 | 18.7 |
| Dicalcium Phosphate ($CaHPO_4$) Equivalent | 56.8 | 63.7 |
| CaO | 30.2 | 34.1 |
| Free Acid as $H_3PO_4$ | 0.0 | 0.0 |
| Fluorine | 0.139 | 0.156 |
| Moisture | 9.98 | 0.28 |
| Phosphorus to Fluorine ratio | 120/1 | 120/1 |

EXAMPLE III

Superphosphoric acid containing 70.49% $P_2O_5$, 30% phosphorus and 0.192% fluorine was hydrolyzed with varying amounts of water to produce diluted superphosphoric acid containing varying amounts of phosphorus pentoxide. These diluted samples were reacted with pulverized calcium oxide in a pan mixer and the percent of buildup of pasty mass in the mixer was noted. In those cases where the buildup was substantial, it was not possible to handle the reaction mixture and obtain complete reaction. In addition, as the buildup attained a significant level, it was not possible to continue agitation of the contents of the mixer. In Table I which follows, several tests utilizing diluted superphosphoric acid diluted to varying degrees in the production of dicalcium phosphate are summarized. In each case, the superphosphoric acid is diluted with water and hydrolysis carried out by heating the diluted acid at 220° F. for 15–20 minutes.

TABLE I

| Test No. | Diluted Superphosphoric Acid Percent $P_2O_5$ | Physical Data | | | Chemical Data Product | | |
|---|---|---|---|---|---|---|---|
| | | Percent Product | Percent Mixer Buildup | Type Buildup | Percent P | Percent CaO | Percent $H_2O$ |
| 1 | 65 | 0.0 | 100 | Massive | 20.5 | 32.5 | 0.2 |
| 2 | 60 | 67.8 | 32.2 | Heavy | 20.7 | 33.9 | 0.5 |
| 3 | 55 | 80.0 | 10.0 | Medium | 20.1 | 32.2 | 0.35 |
| 4 | 55 | 92.96 | 7.04 | do | 19.8 | 32.9 | 0.0 |
| 5 | 50 | 98.57 | 1.43 | Light | 19.2 | 31.1 | 0.55 |
| 6 | 50 | 100.00 | 0.0 | Zero | 19.8 | 30.5 | 1.3 |
| 7 | 45 | 100.00 | 0.0 | do | 18.75 | 33.7 | 0.85 |
| 8 | 45 | 97.53 | 2.47 | Light | 19.2 | 32.0 | 1.5 |
| 9 | 40 | 95.25 | 4.74 | Medium | 18.3 | 33.2 | 9.55 |
| 10 | 40 | 85.8 | 14.2 | do | 19.2 | 32.8 | 6.2 |
| 11 | 35 | 70.0 | 30.0 | Heavy | 17.7 | 31.4 | 13.1 |

That part of the reaction mixture which is expressed as the percent mixer buildup is that portion of the reaction mixture which becomes plastered on the surface of the pan mixer and the percent of product is the calcium phosphate which is easily removed from the pan mixer. In all cases, 1,135 grams of the original superphosphoric acid is diluted with the required amount of water and the diluted acid is reacted with 700 grams of pulverized calcium oxide.

Obviously, many modifications and variations of the invention as herinbefore set forth may be made without departing from the spirit and scope thereof and accordingly, only those limitations should be imposed as are indicated in the appended claims.

I claim:
1. An improved method for manufacturing feed grade dicalcium phosphate comprising: diluting wet-process superphosphoric acid with water to form a dilute aqueous superphosphoric acid solution containing about 40–55% phosphorus pentoxide, contacting said solution with a calcium salt selected from the group consisting of calcium oxide and calcium carbonate and agitating said solution and said calcium salt to form dicalcium phosphate.

2. An improved method for manufacturing feed grade dicalcium phosphate comprising: admixing superphosphoric acid derived from wet-process phosphoric acid and containing about 65–80% phosphorus pentoxide with sufficient water to provide a diluted acid containing about 40–55% phosphorus pentoxide, admixing said diluted acid with a nontoxic calcium salt containing less than about .06% fluorine, agitating the mixture of diluted acid and calcium salt to obtain uniform mutual contact of the reactants and recovering the reaction product.

3. The method of claim 2 wherein the product is then dried.

4. A method for manufacturing feed grade dicalcium phosphate from wet-process superphosphoric acid comprising: admixing wet-process superphosphoric acid with sufficient water to reduce the phosphorus pentoxide content of said acid to about 40–55% phosphorus pentoxide, hydrolyzing the nonorthophosphoric acid content of said superphosphoric acid to orthophosphoric acid by maintaining the aqueous mixture at a temperature of about 71° F. to about 212° F. for a period of about 400 hours to about 2 minutes, contacting the hydrolyzed superphosphoric acid with a particulate nontoxic calcium salt and mixing said calcium salt and hydrolyzed acid whereby to promote distribution of said salt throughout said acid and produce dicalcium phosphate having an elemental phosphorus to elemental fluorine ratio greater than 100 to 1.

5. A method for manufacturing feed grade dicalcium phosphate from wet-process superphosphoric acid containing about 65–80% phosphorus pentoxide comprising: mixing said wet-process acid with sufficient water to reduce the phosphorus pentoxide content of said acid to about 40–55% phosphorus pentoxide, hydrolyzing the nonorthophosphoric acid content of said superphosphorus acid to orthophosphoric acid by holding said aqueous acid at a temperature of about 71–212° F. for a period of about 400 hours to about 2 minutes, contacting the hydrolyzed aqueous acid with approximately a stoichiometric amount of a particulate nontoxic calcium salt and distributing said acid throughout said salt whereby to promote an exothermic reaction producing dicalcium phosphate having an elemental phosphorus/elemental fluorine ratio greater than 100/1.

References Cited

UNITED STATES PATENTS

| 2,948,590 | 8/1960 | Smalter et al. | 23—109 |
| 3,236,593 | 2/1966 | Hartmann et al. | 23—109 |
| 3,294,486 | 12/1966 | Cremer et al. | 23—109 |

FOREIGN PATENTS 782,177  9/1955  Great Britain.

EARL C. THOMAS, *Primary Examiner.*

OSCAR R. VERTIZ, *Examiner.*

L. A. MARSH, *Assistant Examiner.*